US011977647B2

(12) United States Patent
Huapaya

(10) Patent No.: US 11,977,647 B2
(45) Date of Patent: May 7, 2024

(54) METHOD, SERVER AND SYSTEM FOR SECURING AN ACCESS TO DATA MANAGED BY AT LEAST ONE VIRTUAL PAYLOAD

(71) Applicant: THALES DIS CPL USA, INC., Austin, TX (US)

(72) Inventor: Luis Miguel Huapaya, Ottawa (CA)

(73) Assignee: THALES DIS CPL USA, INC., Austin, TX (US)

( * ) Notice: Subject to any disclaimer, the term of this patent is extended or adjusted under 35 U.S.C. 154(b) by 888 days.

(21) Appl. No.: 16/960,216

(22) PCT Filed: Dec. 24, 2018

(86) PCT No.: PCT/CA2018/051669
§ 371 (c)(1),
(2) Date: Jul. 6, 2020

(87) PCT Pub. No.: WO2019/126876
PCT Pub. Date: Jul. 4, 2019

(65) Prior Publication Data
US 2021/0383000 A1  Dec. 9, 2021

(30) Foreign Application Priority Data
Dec. 29, 2017  (EP) .................................... 17211219

(51) Int. Cl.
*G06F 21/60* (2013.01)
*G06F 9/455* (2018.01)
(Continued)

(52) U.S. Cl.
CPC ........ *G06F 21/606* (2013.01); *G06F 9/45558* (2013.01); *G06F 21/53* (2013.01);
(Continued)

(58) Field of Classification Search
CPC .... G06F 21/606; G06F 9/45558; G06F 21/53; G06F 21/54; G06F 21/602;
(Continued)

(56) References Cited

U.S. PATENT DOCUMENTS 10,516,652 B1 *  12/2019  Hashmi ................. H04L 63/061
10,735,190 B1 *  8/2020  Khare .................... H04L 9/0877
(Continued)

FOREIGN PATENT DOCUMENTS

WO  2016105935 A1  6/2016

OTHER PUBLICATIONS

International Search Report (PCT/ISA/210) dated Mar. 11, 2019, by the Canadian Intellectual Property Office as the International Searching Authority for International Application No. PCT/CA2018/051669.
(Continued)

*Primary Examiner* — Bruce S Ashley

(57) ABSTRACT

A first server launches, under control of a device user, an execution of a first virtual payload by using a predetermined service provider interface or a first predetermined application programming interface that is associated with the first virtual payload executed by the first server. The first virtual payload generates a first random nonce. The first virtual payload launches an execution of a second virtual payload by using an associated second predetermined application programming interface. The second virtual payload is executed by the first or a second server. The first virtual payload exchanges with the second virtual payload the first random nonce, so as to establish a first secure channel. The invention also relates to corresponding first server and system.

10 Claims, 2 Drawing Sheets

(51) Int. Cl.
 *G06F 21/53* (2013.01)
 *G06F 21/54* (2013.01)
(52) U.S. Cl.
 CPC ............ *G06F 21/54* (2013.01); *G06F 21/602* (2013.01); *G06F 2009/45562* (2013.01); *G06F 2009/45587* (2013.01)
(58) Field of Classification Search
 CPC . G06F 2009/45562; G06F 2009/45587; G06F 9/455; H04L 9/16; H04L 63/0281; H04L 9/32; H04L 63/04
 See application file for complete search history.

(56) References Cited

U.S. PATENT DOCUMENTS

| | | |
|---|---|---|
| 2014/0282889 A1 | 9/2014 | Ishaya et al. |
| 2014/0331309 A1 | 11/2014 | Spiers et al. |
| 2015/0052525 A1 | 2/2015 | Raghu |
| 2015/0058629 A1 | 2/2015 | Yarvis et al. |
| 2017/0026355 A1 | 1/2017 | Mathaiyan et al. |
| 2018/0337782 A1* | 11/2018 | Wu .......................... H04L 63/06 |

OTHER PUBLICATIONS

Written Opinion (PCT/ISA/237) dated Mar. 11, 2019, by the Canadian Intellectual Property Office as the International Searching Authority for International Application No. PCT/CA2018/051669.

* cited by examiner

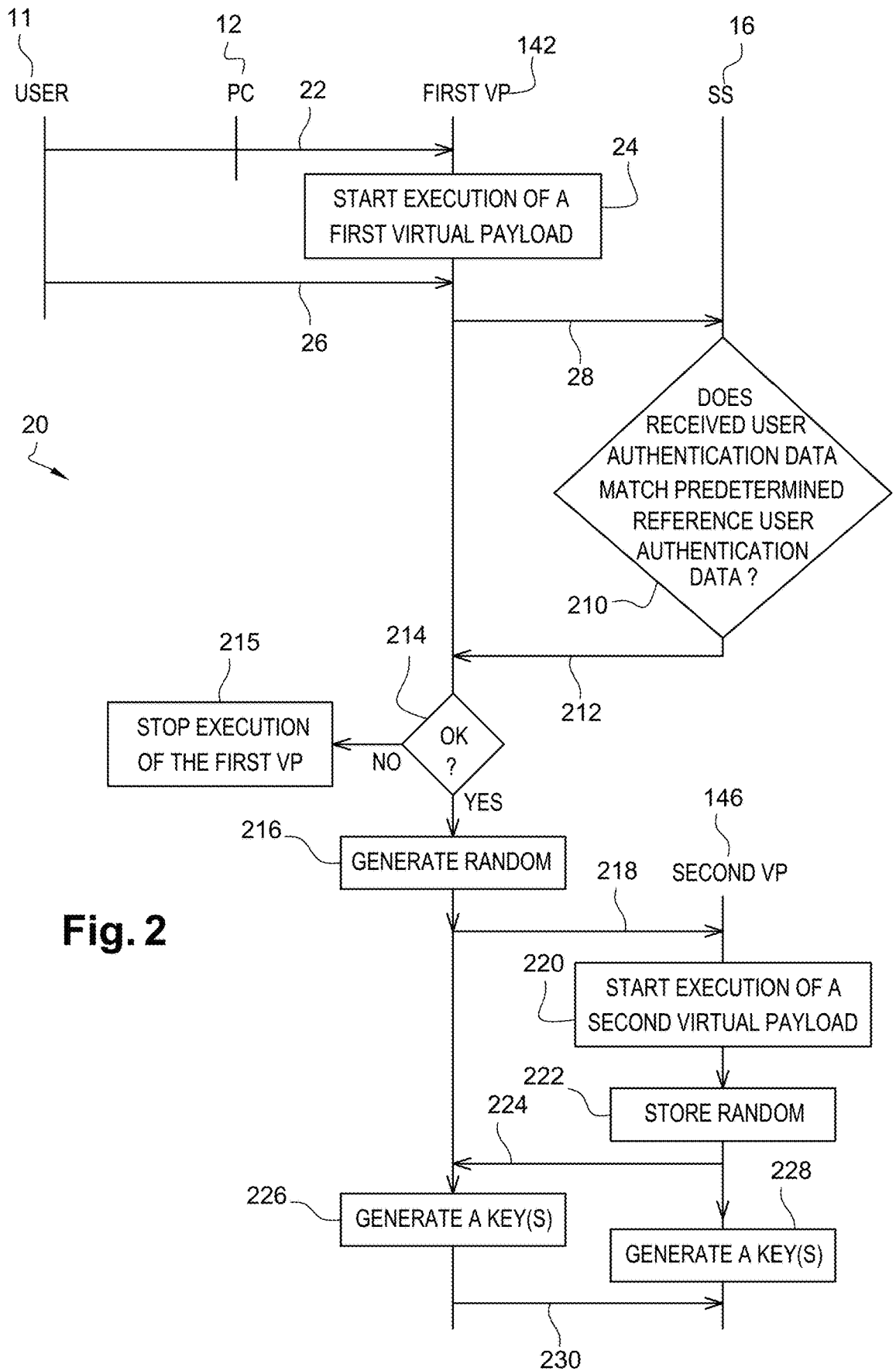

METHOD, SERVER AND SYSTEM FOR SECURING AN ACCESS TO DATA MANAGED BY AT LEAST ONE VIRTUAL PAYLOAD

FIELD OF THE INVENTION

The invention relates generally to a method for securing an access to data managed by one or several Virtual Payloads (or VP).

Furthermore, the invention is a first server for securing an access to data managed by one or several VPs.

Finally, the invention pertains to a system for securing an access to data managed by one or several VPs. The system includes a device and one or several servers.

Within the present description, a VP is an instance or data that is executable that is executed or to be executed by data processing means, such as a (micro)processor, like e.g., a Central Processing Unit (or CPU), that is included or embedded within a host device, such as a server.

The present invention may be notably applicable to a cloud (computing) network or system in which one or several (physical) servers, as (an) host device(s), manage(s) a running or an execution of one or several VPs.

STATE OF THE ART

It is known that a cloud server processes one or several VPs that may be unattended, i.e. started and stopped automatically without any user interaction, and that may, as a multi-tenant cloud server, belong to different respective owners.

However, the cloud service provider (or administrator) or an attacker may access an executed VP that includes sensitive information in plain text exposing or disclosing the sensitive information without neither the knowledge nor the approval of the concerned owner.

There is a need of a solution allowing to protect access to a VP(s) that is(are) to be executed.

SUMMARY OF THE INVENTION

The invention proposes a solution for satisfying the just herein above specified need by providing a method for securing an access to data managed by at least one virtual payload.

According to the invention, the method comprises the following step:

a first server launches, under control of a device user, an execution of a first virtual payload by using a predetermined service provider interface or a first predetermined application programming interface, the predetermined service provider interface or the first predetermined application programming interface being associated with the first virtual payload, the first virtual payload being executed by the first server.

The principle of the invention consists in involving a user control over a device, like e.g., a Personal Computer (or PC), so as to initialize, by a first server, a running of a first VP. To initialize such a first VP running, the user uses a predefined Service Provider Interface (or SPI) or a first predefined Application Programming Interface (or API) that is related to the first virtual payload.

The invention solution is thus based on an involvement of a device user to allow a control of a running of a first VP.

The user may be the owner of the first VP or a person acting on behalf of the first VP owner.

The invention solution allows avoiding to have a need to delegate trust to a concerned (cloud) service provider or administrator.

The invention solution is secure since the concerned user, as preferably the owner of the first VP, is able to authorize an initialization of an execution of the first VP.

Contrary to the known aforementioned solution, the invention solution allows keeping a user control during the whole process of a first VP execution initialization.

Advantageously, once the execution of the first virtual payload is launched, the user provides the first virtual payload with user authentication data;

the first virtual payload or a second server connected to the first virtual payload compares the provided user authentication data to predetermined reference user authentication data; and only if the provided user authentication data matches the predetermined reference user authentication data, the first virtual payload or the second server successfully authenticates the user.

Thus, only a user who is successfully authenticated is able to launch or initialize an execution of the first VP by the first server, so as to further protect and therefore secure access to the first VP.

Advantageously, once the execution of the first virtual payload is launched, the first virtual payload generates at least one first virtual payload clone; and the first virtual payload generates and sends to each of the at least one first virtual payload clone a first random or pseudo-random nonce and each of the at least one first virtual payload clone sends once to the first virtual payload the first random or pseudo-random nonce, so as to establish a first secure channel between each of the at least one first virtual payload clone and the first virtual payload.

Thus, once the first server runs or executes the first VP, the first server initializes, via the running of the first VP, a running of one or several second VPs. To initialize such a second VP running(s), the user uses, for each second VP, a corresponding second predefined API. The first server and/or one or several second servers run(s) the second VP(s).

The invention solution allows therefore preventing a second VP(s) running from any unauthorized person, like e.g., a first or second service provider or administrator or an attacker.

The first VP plays a role of an orchestrator to trigger an execution of any further second VP.

The invention solution does not impose any constraint with respect to the nature of the second VP(s). The second VP(s) may include one or several first VP clones and/or one or several unattended VPs.

Moreover, the first VP plays a role of a proxy, as an additional security layer, i.e. that acts as an intermediary for any request originating from a client which desires some resource(s) used by the first or a second server to execute (or instantiate) other VP(s), as a second VP(s).

Finally, the first VP plays a role of a reverse proxy, i.e. that acts as an internal facing proxy used as a front-end to control and protect access to one or several further second VPs. The first VP, as a reverse proxy, may distribute a payload(s) to one or several other second VPs.

The invention solution ensures notably that a service provider or administrator is not in a position to threaten the assurance level of the second VP(s) and thus any sensitive information that the second VP(s) use(s).

Furthermore, the invention solution is highly scalable since, the first VP, as an orchestrator, manages securely several different (tree) structure embodiments. The structure embodiments include, besides the first VP at the root, a single second VP or a plurality of second VPs. Each structure embodiment includes at least one second VP in a particular dependence order, that results from the first VP involvement, as a mandatory intermediary with each concerned resulting and dependent second VP.

Finally, the invention solution is easily manageable since all of the second VP(s) is accessible only through the first VP and therefore via the original user control.

According to an additional aspect, the invention is a first server for securing an access to data managed by one or several VPs.

According to the invention, the first server is configured to launch, under control of a first server user, an execution of a first virtual payload by using a predetermined service provider interface or a first predetermined application programming interface, the predetermined service provider interface or the first predetermined application programming interface being associated with the first virtual payload, the first virtual payload being executed by the first server.

According to still an additional aspect, the invention is a system for securing an access to data managed by one or several VPs.

According to the invention, the system including a device and at least one server, the at least one server including a first server, the first server is configured to launch, under control of a device user, an execution of a first virtual payload by using a predetermined service provider interface or a first predetermined application programming interface, the predetermined service provider interface or the first predetermined application programming interface being associated with the first virtual payload, the first virtual payload being executed by the first server.

BRIEF DESCRIPTION OF THE DRAWINGS

Additional features and advantages of the invention will be apparent from a detailed description of one preferred embodiment of the invention, in conjunction with the following drawings:

FIG. 2 represents an example of a flow of messages exchanged between the user, the PC and the first VP of the system of FIG. 1, so that the user controls an initialization of an execution of the first VP by the first server and preferably, through the first VP execution, an additional execution of a second VP(s) by the first or a second server, according to the invention.

DETAILED DESCRIPTION

Figure 1:
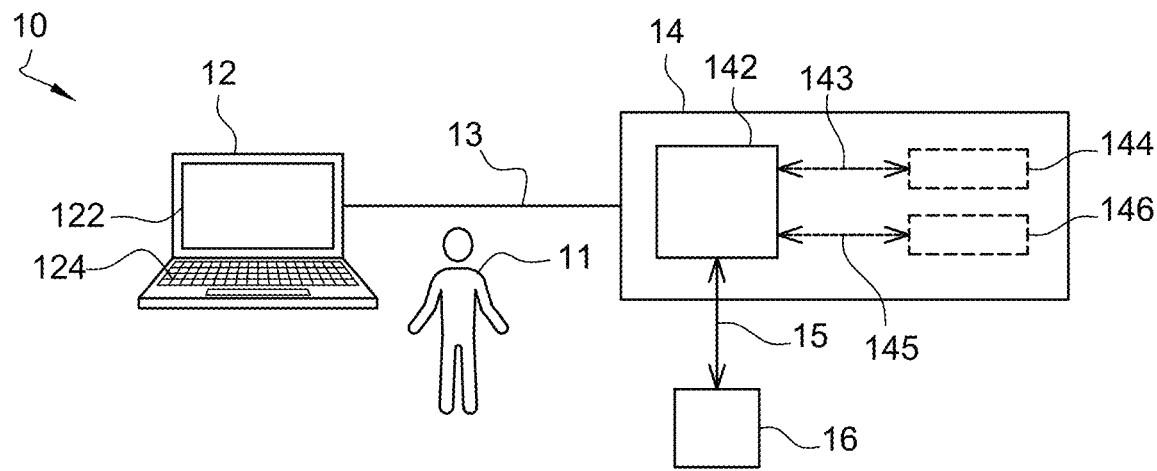
FIG. 1 illustrates a simplified diagram of an exemplary embodiment of a system comprising a PC and a first server, a user using the PC to initialize on-line an execution, by the first server, of a first VP by using a predetermined SPI or API, so that the user controls the first VP execution initialization, according to the invention.

Herein under is considered an exemplary embodiment in which the invention method for securing an access to data managed by one or several VPs is implemented by a PC, its user and one or several servers.

Naturally, the herein below described embodiment is only for exemplifying purposes and is not to be considered to reduce the scope of the invention.

FIG. 1 shows schematically a system 10 for securing an access to data managed by one or several VPs.

The system 10 includes a PC 12, as a user device, and a (web) Cloud Server (or CS) 14.

Instead of being constituted by a PC, the user device may be constituted by e.g., a mobile phone, a tablet computer, a desktop computer, a laptop computer, a Personal Digital Assistant (or PDA), a Secure Element (or SE) or any other computer device connected to or including a Man Machine Interface (or MMI).

Within the present description, an SE is a smart object that includes a chip that protects, as a tamper resistant component, access to stored and processed data and is intended to communicate data with an SE host device, such as a PC.

The PC 12 includes one or several CPUs or processors (not represented), as data processing means, one or several memories (not represented), as data storing means, and one or several Input/Output (or I/O) interfaces (not represented) that are internally all connected to each other.

The PC 12 includes preferably (or is connected to) a display screen 122 and a keyboard 124, as an MMI. The MMI allows the user 11 to interact with the PC 12 and, through the PC 12, with an external entity(ies), such as the CS 14.

The CS 14 may be included within a public cloud (computing) network (not represented), as an unsecure environment.

The CS 14 is operated by a (cloud) service provider (or on its behalf).

The CS 14 includes one or several CPUs or processors (not represented), as data processing means, one or several memories (not represented), as data storing means, and one or several I/O interfaces (not represented) that are internally all connected to each other.

The CS 14 supports an Operating System (or OS).

According to an essential feature of the invention solution, the CS 14 is configured to launch, under control of a PC user 11, an execution of a first VP 142 by using a predetermined Service Provider Interface (or SPI) or a first predetermined Application Programming Interface (or API1).

Alternately (not represented), the CS 14, as a local computer including or being connected to an MMI, is arranged to launch, under a local control of a CS user, an execution of a first VP 142 by using a predetermined SPI or a first predetermined API1.

The PC 12 is connected, through a first link 13, via a preferably secure (data communication) channel, to the first VP 142. The first channel may be related to an HyperText-Transfer Protocol (or HTTP) (registered trademark) or HTTP Secure (or HTTPS) type channel or any other data communication channel.

The predetermined SPI or the API1 is associated with the first VP 142 and may be provided by the concerned Service Provider or on its behalf.

The first VP 142 is advantageously arranged to authenticate (or let another server, such as a Secure Server (or SS), authenticate) the user 11. To authenticate the user 11, the first 142 VP (or another server) receives from or through the PC 12 user authentication data. The first 142 VP (or another server) compares the received or submitted user authentication data to predetermined reference user authentication data. If the received or submitted user authentication data does not match the predetermined reference user authentication data, then the first VP 142 (or another server) fails to authenticate the user 11. Otherwise, i.e. if the received or submitted user authentication data matches the predetermined reference user authentication data, the first VP 142 (or another server) succeeds in authenticating the user 11.

The first VP 142 is preferably able to generate one or several random or pseudo-random nonces in a sufficiently large manner so as not to be recognized or generated by an attacker. The (pseudo) random nonce may be used only once, i.e. valid only one single time, as a parameter for starting or launching an execution of another VP, such as a first VP clone or a Virtual Unattended Payload (or VUP). The concerned VP uses the random nonce to establish a secure channel with the first VP 142.

The first VP 142 may be able to generate one or several first VP clones 144. Each first VP clone is a copy of the first VP 142 executable data. The first VP 142 and the first VP clone(s) 144 form together a first VP cluster that is able to process a greater number of payloads for the one and the same provided service.

The first VP 142, upon being executed, sends, through a second link 143, once to each (or certain) of the first VP clones 144 a (or the) generated first (pseudo)random nonce, as a VP execution start-up parameter, and possibly metadata, such as an Internet Protocol (or IP) address of the first VP 142. Then, the first VP 142 and the (or each) concerned first VP clone 144, upon being executed, both generate, based on the shared first random nonce, a key(s) for enciphering and/or deciphering data. Thus, the first VP 142 and the (or each) concerned first VP clone 144 are able to establish a first secure channel between them. The first VP 142 and the (or each) concerned first VP clone 144 are able to exchange data in a protected and confidential manner since they share the key(s) for enciphering and/or deciphering data.

The first VP 142, upon being executed, preferably sends, through a third link 145, once to each (or certain) of a second VP 146 a (or the) second generated (pseudo)random nonce, as a VP execution start-up parameter, and possibly metadata, such as an Internet Protocol (or IP) address of the first VP 142. Then, the first VP 142 and the (or each) concerned second VP 146, upon being executed, both generate, based on the shared second random nonce, a key(s) for enciphering and/or deciphering data. Thus, the first VP 142 and the (or each) concerned second VP 146 establish a second secure channel between them. The first VP 142 and the (or each) concerned second VP 146 are then able to exchange data in a protected and confidential manner.

According to an interesting invention feature, the CS 14 is further adapted to launch, through the first VP 142 execution, an execution of one or several second VPs 146 by using a respective predetermined second Application Programming Interface (or API2). The (or each) API2 is associated with a corresponding second VP 146.

The CS 14 (or another server (not represented)) executes the (or each) second VP 146.

Each first 142, clone 144 or second 146 VP may include one or several containers, one or several virtualization engines, one or several jails, one or several machines, one or several partitions, one or several workloads and/or one or several data codes, as an instance or data that is executable by the CS 14 or another server.

Each first 142, clone 144 or second 146 VP comprises data that may include, as sensitive information, predetermined user identification data, (the) predetermined user authentication data, predetermined authentication credentials and/or other sensitive data.

The sensitive data may be stored within one or several SSs 16, as (a) secure enclave(s). Each (or the) secure enclave stores within a memory(ies) securely data. The SS 16 is connected, through a bidirectional wire or wireless link 15, via a preferably secure channel, to the CS 14.

Alternately (instead of storing the data in a secure enclave) or additionally, the sensitive data included in the first 142, clone 144 or second 146 VP is enciphered. The enciphered sensitive data is deciphered by the first VP 142. To decipher the enciphered sensitive data, the first VP 142 uses a key for deciphering the data. Such a data deciphering key may be stored in a secure enclave such as a Hardware Security Module (or HSM) type server. The HSM type server stores securely data, such as one or several cryptographic keys, like e.g., a (data) encipherment key(s), a (data) decipherment key(s), a key(s) for verifying a signature and/or a key(s) for generating a signature.

The SS 16 is preferably located in a premise of the user 11 or on her or his behalf, i.e. outside the cloud network, as a secure environment.

The SS 16 includes one or several CPUs or processors (not represented), as data processing means, one or several memories (not represented), as data storing means, and one or several I/O interfaces (not represented) that are internally all connected to each other.

The SS 16 allows storing and protecting sensitive information or data possibly in a separate and isolated manner depending on the type of the concerned sensitive data.

The SS 16 preferably provides, in a protected manner, information or data only when required or used by a VP(s) to be executed.

The SS 16 is preferably arranged to authenticate the user 11, i.e. to verify whether the user 11 does or does not authenticate. To authenticate the user 11, the SS 16 receives, through the PC 12 and the first VP 142, as a user authentication delegator, user authentication data originating from the user 11. The SS 16 compares the received (or submitted) user authentication data to predetermined reference user authentication data. If the received (or submitted) user authentication data does not match the predetermined reference user authentication data, then the SS 16 fails to authenticate the user 11. Otherwise, i.e. if the received or submitted user authentication data matches the predetermined reference user authentication data, the SS 16 succeeds in authenticating the user 11.

The SS 16 is dedicated to manage sensitive data that is included within or used by a VP(s) to be executed by the CS 14 (and/or any other server involved in executing a VP(s)), so as to further protect access to the VP(s) to be executed. The SS 16 thus allows the VP(s) to be executed not to need to store and persist sensitive data, such as identifying information and/or authentication credentials, within the concerned VP(s) to be executed.

Once the first VP clone 144 (or the second VP 146) has authenticated itself to the first VP 142 by using the first (or second) random nonce and has established a secure channel with the first VP 142, the first VP clone 144 (or the second VP 146) retrieves from the first VP 142 any sensitive data, such as the user authentication data, that was previously provided possibly by the user 11, such as user credentials that are manually entered by the user 11. Thus, the first VP clone 144 (or the second VP 146) also authenticates itself to the SS 16 and establishes a secure channel with the SS 16 as well.

Alternately, i.e. instead of retrieving the user authentication data from or through the first VP 142, the first VP clone 144 (or the second VP 146) retrieves (directly) from the user 11 user authentication data that may be processed by the first VP clone 144 (or the second VP 146) itself or delegated to the first VP 142 or (sub)delegated through the first VP 142 to the SS 16. Thus, the first VP clone 144 (or the second VP 146) authenticates or lets the first VP 142 or the SS 16 (through the first VP 142) authenticate the user 11.

FIG. 2 depicts an example of a message flow 20 that involves the user 11, the PC 12, a first VP 142 and the SS 16, so that the CS 14 launches, under control of the PC user 11, an execution of the first VP 142 and then, through the first VP 142 execution, a second VP 146 execution.

It is assumed that only one second VP 146 is further launched in execution. The second VP 146 may be a Virtual Unattended Payload (or VUP) or a first VP clone.

It is further assumed that the user 11 has previously registered (not represented) at the SS 16, as a secure enclave, one (or several) IDentifier(s) (or ID) user 11, such as a user name and/or an ID(s) relating to the PC 12, in association with corresponding reference user authentication data, like e.g., a password and/or user biometric feature(s), such as a user fingerprint(s), a user face(s), a user iris and/or a user palm(s).

The PC 12 may be identified by an IP address and registered as a user ID. The PC 12 may constitute a reference user device to be used, so as to authenticate the user 11.

It is additionally assumed that the user 11 is the owner of the code or program instructions related to the first VP 142.

According to an essential invention feature, the user 11 sends, through the PC 12, to the (or one of a plurality of) CS 14 (processor(s)) a request 22 for launching an execution of a first VP 142. To send, under control of the (PC) user 11, a first VP 142 execution launching request, the user 11 uses by manually typing a predetermined SPI, a predetermined API1 or any other interface that allows the user 11 to access the first VP 142.

The chain-of-custody of data that flows through the first VP 142 remains thus under the user 11 control.

The SPI, the API1 or the like is associated with the first VP 142 and may be provided by the concerned service provider. The SPI, the API1 or the like is known to the user 11 and/or previously stored in a memory included within the PC 12 or a device cooperating with the PC 12, such as an SE.

The SE may have previously authenticated successfully the concerned user 11. The invention does not impose any constraint as to a use of an SE and a kind of the SE, when present. The SE may have different form factors. As a removable SE, it may be a Secure Removable Module (or SRM), a smart dongle of the USB (acronym for "Universal Serial Bus") type, a (micro-) Secure Digital (or SD) type card, a Multi-Media type Card (or MMC), a Subscriber Identity Module (or SIM) type card or any format card to be coupled to a host device. The SE may be an incorporated chip, like e.g., an embedded Universal Integrated Circuit Card (or eUICC) or an integrated Universal Integrated Circuit Card (or iUICC), within an SE host device, or a chip that is coupled to an SE host device, and included within a smart card (or another medium). The chip may therefore be fixed to or removable from the PC 12, as the chip host device. The SE chip(s) may incorporate at least part of the host device component(s), like e.g., a baseband processor, an application processor(s) and/or other electronic component(s). Alternately, the SE chip(s) include(s) a Trusted Execution Environment (or TEE), as a secure area of a PC (or terminal) processor and a secured runtime environment. The SE chip(s) is(are) preferably incorporated, possibly in a removable manner, within a Printed Circuit Board (or PCB) of the PC 12, as an SE host device.

The CS 14 (processor) starts or launches 24 an execution of the first VP 142.

The first VP 142, upon being executed, then waits for an incoming connection from the user 11. Such a first communication channel is established between the user 11 and the first VP 142.

The chain-of-custody of any data that flows through the first communication channel remains under control of the sole user 11.

When the CS 14 (processor) is executing the first VP 142, the PC 12 is connected, through the CS 14 OS, to the first VP 142.

The first VP 142 allows the user 11 (or customer), possibly further to a first VP 142 request, to provide user authentication data, such as credentials, like e.g., a password, entered or and/or biometric feature(s) provided or submitted by the user 11, as second Factor Authentication (or 2FA).

The first VP 142 protects the corresponding predetermined reference user authentication data, as secret data, and possibly other additional secret data in the SS 16, as secure enclave. It is thus impossible for anyone, such as a service provider or administrator inside the CS 14, to spy the secret data within the first VP 142.

The first VP 142 becomes thus a secure proxy for secret/sensitive data that is stored and managed by the SS 16.

Optionally but preferably, the user 11 sends or submits, through the PC 12, to the (executed) first VP 142 user authentication data 26. The first VP 142 preferably delegates, instead of authenticating on its own the user 11, to the SS 16 a user authentication. The first VP 142 then sends or forwards, via a preferably secure channel, to the SS 16 the received or submitted user authentication data 28. The SS 16 verifies 210 whether the received or submitted user authentication data does or does not match the (stored) predetermined reference user authentication data. To verify whether the user 11 is or is not authenticated, the SS 16 compares the received or submitted user authentication data to the predetermined reference user authentication data. The SS 16 preferably sends to the first VP 142 a result 212 of the user authentication, namely a user authentication success, such as "OK", or a user authentication failure, such as "KO".

The first VP 142 verifies 214, based on the received result, whether the user 11 is or is not authenticated.

In the negative, i.e. if the received or submitted user authentication data does not match the predetermined reference user authentication data, the first VP 142 fails to authenticate the user 11 and denies user 11 access to a service(s) managed by or through the first VP 142 by stopping 215 the execution of the first VP 142.

In the affirmative, i.e. if the received or submitted user authentication data matches the predetermined reference user authentication data, the first VP 142 authenticates (successfully) the user 11 and grants user 11 access to the service(s) managed by or through the first VP 142 by continuing the execution of the first VP 142.

The first VP 142 may send to the PC 12 a message (not represented) including a request to present to the user 11 or display the user authentication result. Then, the PC 12 presents or displays (or lets another device display) the user authentication result (not represented), such as "User authentication failure" or "User authentication success".

When the user 11 is successfully authenticated by the SS 16, the channel between the user 11 and the SS 16 becomes secure, i.e. a secure connection is established between the user 11, the first VP 142 and the SS 16.

The first VP 142 provides a virtual root of trust to e.g., start/stop automatically a VUP(s), as a second VP(s).

Once at least the first VP 142 execution has been successfully initialized under user control, the first VP 142, upon being executed, is able to instantiate or launch an execution of a second VP(s).

Then, the CS 14 processor while executing the first VP 142 sends to a second VP 146 a message 216 including a request for launching an execution of the second VP 146. Such a message 216 includes or is accompanied with a predetermined API2 (or the like). The API2 is associated with the second VP 146 and is known to the first VP 142.

The first VP 142 preferably generates 216 dynamically (i.e. on-the-fly) a first random or pseudo-random nonce, i.e. that is to be used only once, as a parameter for starting or launching an execution of a second VP 146. A use of the generated first (pseudo)random nonce is unique and ephemeral, namely only at a start time of a second VP 146 to be executed, and allows establishing a secure (communication) channel between the first VP 142 and the second VP 146 to be executed.

The first VP 142, upon being executed by the CS 14, sends to the second VP 146 a message 218 including a request for launching an execution of the second VP 146. The second VP execution launching request includes or is accompanied with a predetermined API2 and preferably the first (generated) random nonce, as a second VP execution launching parameter, and possibly metadata, such as an IP address of the first VP 142.

The predetermined API2 is associated with the second VP 146 and is known by the first VP 142 owner. The API2 is provided by the service provider related to the second VP 146.

Once the second VP execution launching request is received and processed, the CS 14 (processor), through the execution of the first VP 142, starts or launches 220 an execution of the second VP 146.

The second VP 146 stores 222 preferably temporarily and during a very short time period, i.e. up to few milliseconds, the first (received) (generated) random nonce.

The first random nonce, as a One Time Password (or OTP), is the sole parameter that is exchanged within the CS 14 provider's (or administrator's) chain-of-custody, i.e. the data that is hosted within code (or program instructions) that is maintained and controlled by the CS 14 service provider. Since the OTP has a very short life span and may only be used once, the first VP 142 is able to detect unintended use of the OTP. Thus, the first VP 142 may reject trust in any connection request that uses such an OTP.

The second VP 146 preferably sends 224 to the first VP 142 only once the first random nonce preferably in a very short time period from the message 218 reception, i.e. up to few milliseconds, so as to authenticate and establish a secure channel between the first 142 and second 146 VPs. Thus, if another VP (or the like) tries to intercept and also use the first random nonce, then the first VP 142 observes two separate connection requests with only one first random nonce and is therefore able to reject both within the very short time period.

The first VP 142, upon being executed, compares (not represented) the first random nonce that is received from the second VP 146 to the previously generated first random nonce.

If the comparison fails, i.e. the received first random nonce does not match the previously generated first random nonce (to be matched), then the first VP 142 fails to authenticate the second VP 144. The first VP 142 may send to the second VP 146 a message (not represented) including an error or failure code. Such an error or failure code allows informing the second VP 146 that the first VP 142 fails to authenticate the second VP 146. The first VP 142 terminates the communication with the concerned second VP 146.

Otherwise, i.e. if the comparison is successful, namely the received first random nonce matches the previously generated first random nonce, the first VP 142 authenticates successfully the second VP 146.

The first VP 142 allows to establish a secure channel with the second VP 146.

The first 142 and second 146 VPs may share an algorithm for generating a key for enciphering and/or a key for deciphering data.

The first VP 142, upon being executed, generates 226, while using the common key generation algorithm and the shared first random nonce, as data input to the key generation algorithm, a first key for enciphering data and/or a second key for deciphering data, as an enciphering/deciphering key(s).

The second VP 146, upon being executed, also generates 228 separately, while using the common key generation algorithm and the shared first random nonce, as data input to the key generation algorithm, a first key for enciphering data and/or a second key for deciphering data, as the enciphering/deciphering key(s).

After a separate enciphering/deciphering key generation, the first 142 and second 146 VPs are able to exchange data in a ciphered (and therefore secure) manner since the first 142 and second 146 VPs share the enciphering/deciphering key(s). The enciphering/deciphering key(s) allow(s) to establish a secure channel between the first 142 and second 146 VPs.

The second VP 146, upon being executed, then waits for an incoming connection from the first VP 142.

The first VP 142 enciphers data to be sent to the second VP 146 while using the shared encipherment key. The first VP 142 sends to the second VP 146 a message 230 that includes the enciphered data. The second VP 146 deciphers the (received) enciphered data while using the shared decipherment key, so as to access the concerned data in plain text, as data input to a processing related to the second VP 146. Then, an execution of the second VP 146 allows to provide a first result, as the resulting data, to be sent to the first VP 142. Once the second VP 146 has processed the concerned (received) data while executing the service associated to the second VP 146, the second VP 146 enciphers the first result while using the shared encipherment key. The second VP 146 sends to the first VP 142 a message (not represented) that includes the enciphered first result. The first VP 142 deciphers the (received) enciphered first result while using the shared decipherment key, so as to access the concerned first result in plain text.

Once the first 142 and second 146 VPs have established a secure channel, the second VP 146 is able to use the secure channel to request the first VP 142 to retrieve specific secret data, such as credentials, that may be stored within the SS 16, as a secure enclave.

According to a particular embodiment in which the SS 16 only stores secret data, the first VP 142 firstly requests and receives securely from the SS 16 the specific requested secret data and secondly sends securely to the second VP 146 the specific requested secret data.

Alternately, the first VP 142 firstly retrieves internally the specific requested secret data and secondly sends securely to the second VP 146 the specific requested secret data.

Then, the first VP 142, when still executed by the CS 14, may preferably generate a second (pseudo) random nonce, as a parameter for starting or launching an execution of an additional VP, and send to an additional second VP to be executed (not represented) the second random nonce. Thus, like the first VP 142 and the second VP 146, the first VP 142 and the additional second VP establish a secure channel by using the shared second random nonce. Then, an execution of the additional second VP allows to provide, based on the first result provided by the first VP 142, a second result, as the resulting data, to be sent back to the first VP 142. The additional second VP sends to the first VP 142 a message (not represented) that includes the enciphered second result that the first VP 142 then deciphers to access the concerned second result in plain text.

Such a process of exchanging securely data may be repeated as much as required between the first VP 142 and an additional second VP to be executed, through the first VP 142 execution, so as to provide securely data resulting from a succession of required second VPs.

The second VP 146, upon being executed, preferably uses the (established) secure channel to access and exchange securely sensitive data, when applicable, i.e. that is used by the second VP 146 and that is managed by or through the first VP 142. The use of such a secure channel is totally safe for the thus communicated data between the first VP 142 and the second VP 146.

A chain-of-custody of data that flows through the second communication channel (i.e. between the first VP 142 and the second VP 146) remains under control of the sole user 11 and therefore secure.

According to a preferred embodiment, the second VP 146, upon being executed, establishes a second secure channel with the first VP 142 that has established a first secure channel with the SS 16. Thus, a resulting secure channel is formed or constituted between the second VP 146 and the SS 16.

The user 11 is therefore assured that her or his sensitive data, as being stored and managed by the SS 16, can never be stolen by, among others, the CS 14 provider or administrator which may spy.

The invention solution is simple.

The invention solution does not need to delegate trust to any (cloud) service provider.

The invention solution allows providing, via a dedicated VP, as a first and central VP orchestrator and manager, a sole user control, so as to access data managed by a VP(s) to be executed, such as a VUP(s).

The invention solution allows the VP(s) to be executed not to need to persist sensitive (or secret) data, such as identifying information and/or authentication credentials, within the concerned VP(s).

The invention solution allows keeping a full user control during all the VP execution initialisation process.

The invention solution allows securing an execution of one or several VPs to be executed while forbidding any unauthorized access, such as from a service provider which does not own the VPs, and protecting thus access to data managed by the concerned VPs.

The invention solution may be used notably when an ecosystem using the first server needs to scale up a VUP(s), as a second VP(s), to meet an increasing demand and when an existing VUP dies unexpectedly and another VUP, as a second VP, needs to spin back up while letting intercede the first VP, as a VP manager.

The concerned VPs, as second VPs, are still able to authenticate successfully to a service(s), like e.g., a service(s) that is(are) provided by an HSM.

The invention claimed is:

1. A method for securing an access to data managed by at least one virtual payload,
wherein the method comprises the following steps:
a first hardware server launches, under control of a device user, an execution of a first virtual payload by using a predetermined service provider interface or a first predetermined application programming interface, the predetermined service provider interface or the first predetermined application programming interface being associated with the first virtual payload, the first virtual payload being executed by the first hardware server;
once the device user is authenticated, the first virtual payload generates a first random or pseudo-random nonce;
the first virtual payload sends to the second virtual payload the first random or pseudo-random nonce;
the first hardware server launches, through the first virtual payload execution, an execution of a second virtual payload by using a second predetermined application programming interface, the second predetermined application programming interface being associated with the second virtual payload, the second virtual payload being executed by the first hardware server or a second hardware server; and
the second virtual payload sends once to the first virtual payload the first random or pseudo-random nonce, which is received by the first virtual payload and compared with the previously originated one so as to establish a first secure channel between the second virtual payload and the first virtual payload if the comparison is successful, the first virtual payload thus playing a role of an orchestrator to trigger an execution of any further second virtual payload accessible only through the first virtual payload.

2. The method according to claim 1, wherein, once the execution of the first virtual payload is launched,
the user provides the first virtual payload with user authentication data;
the first virtual payload or the second hardware server connected to the first virtual payload compares the provided user authentication data to predetermined reference user authentication data; and
only if the provided user authentication data matches the predetermined reference user authentication data, the first virtual payload or the second hardware server successfully authenticates the user.

3. The method according to claim 1, wherein, once the execution of the first virtual payload is launched,
the first virtual payload generates at least one first virtual payload clone; and
the first virtual payload generates and sends to each of the at least one first virtual payload clone a second random or pseudo-random nonce and each of the at least one first virtual payload clone sends once to the first virtual payload the second random or pseudo-random nonce, so as to establish a second secure channel between each of the at least one first virtual payload clone and the first virtual payload.

4. The method according to claim 1, wherein the first virtual payload generates, by using a key generation algorithm and the shared first random nonce, as data input to the key generation algorithm, a key for enciphering and deciphering data and the second virtual payload generates separately, by using the key generation algorithm and the shared first random nonce, as data input to the key generation algorithm, the key for enciphering and deciphering data, the key for enciphering and deciphering data allowing to establish the first secure channel between the first virtual payload and the second virtual payload.

5. The method according to claim 4, wherein the first virtual payload enciphers data to be sent to the second virtual payload while using the key for enciphering and deciphering data, the first virtual payload sends to the second virtual payload the enciphered data and the second virtual payload deciphers the enciphered data while using the key for enciphering and deciphering data.

6. The method according to claim 5, wherein the second virtual payload uses the first secure channel to access securely secret data.

7. The method according to claim 6, wherein, the secret data being stored within a secure enclave, the second virtual payload requests, by using the first secure channel, the first virtual payload to retrieve the secret data, the first virtual payload requests and receives securely from the secure enclave the secret data, the first virtual payload sends securely to the second virtual payload the secret data.

8. A first hardware server for securing an access to data managed by at least one virtual payload,
wherein the first hardware server is configured to launch, under control of a first hardware server user, an execution of a first virtual payload by using a predetermined service provider interface or a first predetermined application programming interface, the predetermined service provider interface or the first predetermined application programming interface being associated with the first virtual payload, the first virtual payload being executed by the first hardware server;
wherein the first virtual payload is configured to:
once the device user is authenticated, generate a first random or pseudo-random nonce;
send to the second virtual payload the first random or pseudo-random nonce;
launch an execution of a second virtual payload by using a second predetermined application programming interface, the second predetermined application programming interface being associated with the second virtual payload, the second virtual payload being executed by the first hardware server;
and wherein the second virtual payload is configured to send once to the first virtual payload the first random or pseudo-random nonce, which is received by the first virtual payload and compared with the previously originated one so as to establish a first secure channel between the second virtual payload and the first virtual payload if the comparison is successful, the first virtual payload thus playing a role of an orchestrator to trigger an execution of any further second virtual payload accessible only through the first virtual payload.

9. The first hardware server according to claim 8, wherein the first virtual payload includes at least one element of a group comprising:
at least one container;
at least one virtualization engine;
at least one jail;
at least one machine;
at least one partition;
at least one workload; and
executable data.

10. A system for securing an access to data managed by at least one virtual payload,
wherein, the system includes a device and at least one hardware server, the at least one server including a first hardware server, the first hardware server being configured to:
launch, under control of a device user, an execution of a first virtual payload by using a predetermined service provider interface or a first predetermined application programming interface, the predetermined service provider interface or the first predetermined application programming interface being associated with the first virtual payload, the first virtual payload being executed by the first hardware server;
wherein the first virtual payload is configured to:
once the device user is authenticated, generate a first random or pseudo-random nonce;
send to the second virtual payload the first random or pseudo-random nonce;
launch an execution of a second virtual payload by using a second predetermined application programming interface, the second predetermined application programming interface being associated with the second virtual payload, the second virtual payload being executed by the first hardware server or a second hardware server; and
and wherein the second virtual payload is configured to send once to the first virtual payload the first random or pseudo-random nonce, which is received by the first virtual payload and compared with the previously originated one so as to establish a first secure channel between the second virtual payload and the first virtual payload if the comparison is successful, the first virtual payload thus playing a role of an orchestrator to trigger an execution of any further second virtual payload accessible only through the first virtual payload.

* * * * *